United States Patent
de Mars et al.

(10) Patent No.: US 10,204,144 B2
(45) Date of Patent: Feb. 12, 2019

(54) AUTOMATED DATABASE RECORD ACTIVATION USING PREDICTIVE MODELING OF DATABASE ACCESS

(71) Applicant: Airbnb, Inc., San Francisco, CA (US)

(72) Inventors: Spencer de Mars, San Francisco, CA (US); Kim Pham, San Francisco, CA (US); Maxim Charkov, San Francisco, CA (US)

(73) Assignee: Airbnb, Inc., San Francisco, CA (US)

( * ) Notice: Subject to any disclaimer, the term of this patent is extended or adjusted under 35 U.S.C. 154(b) by 394 days.

(21) Appl. No.: 14/815,655

(22) Filed: Jul. 31, 2015

(65) Prior Publication Data
US 2017/0031914 A1    Feb. 2, 2017

(51) Int. Cl.
| | | |
|---|---|---|
| *G06Q 50/14* | (2012.01) | |
| *G06Q 30/02* | (2012.01) | |
| *G06Q 10/02* | (2012.01) | |
| *G06F 7/00* | (2006.01) | |
| *G06F 17/30* | (2006.01) | |

(52) U.S. Cl.
CPC .... *G06F 17/3053* (2013.01); *G06F 17/30554* (2013.01); *G06Q 10/02* (2013.01); *G06Q 30/0205* (2013.01); *G06Q 50/14* (2013.01)

(58) Field of Classification Search
CPC .......... G06F 17/30241; G06F 17/3087; G06F 17/30365; G06F 17/3053; G06Q 10/02; G06Q 10/04; G06Q 50/12; G06Q 50/14; G06Q 30/0205; G06Q 50/163
See application file for complete search history.

(56) References Cited

U.S. PATENT DOCUMENTS

| | | | | |
|---|---|---|---|---|
| 2002/0072940 A1* | 6/2002 | Keough | ................ | G06Q 10/02 705/5 |
| 2003/0023453 A1* | 1/2003 | Hafen | .................. | G06Q 10/02 705/5 |

(Continued)

OTHER PUBLICATIONS

Airbnb.com, How much time do I have to respond to a guest's reservation request?, https://web.archive.org/web/20120630004114/http://www.airbnb.com:80/help/question/hosting/29, Jun. 30, 2012, 5 pp.*

(Continued)

*Primary Examiner* — Marc S Somers
(74) *Attorney, Agent, or Firm* — Fenwick & West LLP

(57) ABSTRACT

A computer implemented system and method for selecting and notifying operators of the option to enable a record activation feature for a short interval of time for the records they offer in a selected geographic area. Enabling record activation for a record indicates that the record may be booked by a user without first requesting the operator to manually approve the transaction request and waiting for the operator's approval of the request. Before selecting and notifying operators, a demand for database requests is predicted. Operators that are most likely to offer their record for record activation are identified. A quality score is determined for each identified record based on the likelihood that the record will get booked once the operator has programmatically enabled record activation. The records needed to fulfill the demand for database requests are selected based on their quality score and the operators of the selected records are notified of the option to enable record activation.

11 Claims, 8 Drawing Sheets

(56) References Cited

U.S. PATENT DOCUMENTS

| | | | |
|---|---|---|---|
| 2006/0168054 A1* | 7/2006 | Burkhart | H04L 51/04 709/206 |
| 2007/0038503 A1* | 2/2007 | Krajcev | G06Q 10/02 705/301 |
| 2014/0278591 A1 | 9/2014 | Blecharczyk et al. | |
| 2015/0242827 A1* | 8/2015 | Guo | G06Q 20/145 705/13 |

OTHER PUBLICATIONS

Airbnb.com, How much should I charge for my listing?, https://web.archive.org/web/20120622150934/http://www.airbnb.com:80/help/question/52, Jun. 22, 2012, 5 pp.*

Airbnb.com, Can I have Instant Book on my listing?, https://web.archive.org/web/20120628021537/http://www.airbnb.com:80/help/question/335, Jun. 28, 2012, 6 pp.*

PCT International Search Report and Written Opinion, PCT Application No. PCT/US2016/043956, dated Sep. 6, 2016, 12 pages.

\* cited by examiner

AUTOMATED DATABASE RECORD ACTIVATION USING PREDICTIVE MODELING OF DATABASE ACCESS

TECHNICAL FIELD

This invention relates to computerized database systems, and particularly to computer executed mechanisms for automatically activating selected records based on predictive models of user requests for particular database records, and enabling the record operators to programmatically enable access to other database records.

BACKGROUND

Online computer database systems store various types of records, such as records of products, services, media, text documents, and so forth. In some database systems, the records are managed by different individual operators, who control the parameters by which their records are available to other database users for inspection and access. In many systems, there is continually varying demand by users for access to the records of the different operators, where the demand varies based on factors such as the location of the users, the specific attributes of each record, seasonality, and other internal or exogenous factors.

An example database in which different operators have control of database records, and users search for such records with varying demand is a database that stores records describing goods and services ("resources") for sale, license, and reservation (for simplicity, "transaction" generally) that have or are associated with real world locations that have intangible value to the prospective consumer. Online, reservations database systems (referred to herein as "reservation systems") provide a suitable example. One type of reservation systems is programmed to enable potential users to search the database for records of accommodations. After finding a suitable accommodation record, the potential user sends via the reservation system a request to the operator managing the record to book the accommodation described in the record that is to engage in a transaction with respect to the record. The operator may take a certain amount of time to respond to the request. Using this type of approach, there is no way that the operator or user could eliminate this time delay. In case of a high demand for accommodations in a geographic area with a short lead time, for example, high demand for accommodations available in the next 48 hours, this inherent delay can result in a loss of a transaction by an operator, and the concomitant inability of a user to find a suitable accommodation. In some reservation systems, an operator can pre-designate that an accommodation record may be booked without the operator's manual approval. However, if the operator does not pre-designate a record in this manner, it cannot be booked without the operator's manual approval, regardless of the level of unmet demand.

SUMMARY

A reservation database system is configured to enable users to create records of goods or services, search records created by other users, and enter into transactions with respect to records of interest to them. The online reservation system comprises a record activation module, that allows an operator to programmatically activate a record to be accessible by other users for a limited time period, wherein the record is enabled for an immediate transaction by a user without first requesting the operator to manually approve the transaction and waiting for the operator's approval of the transaction via the online reservation system. The reservation system determines which records are suitable for programmatic activation using a predictive model of user demand as indicated by database searches and transactions.

The online reservation system is configured by the record activation module to generate a predictive model that estimates potential user demand for database requests in a selected geographic area for a certain period of time based on the historical information of transactions, database searches for the present time interval or future information of events in the selected geographic area. For example, holiday season may create a high demand every year in a particular area as indicated by increased database searches and transactions, or an event or a conference in a certain area may create a high demand for a few days, or a ski area may create a high demand due to a recent snowfall in the area, thereby creating an unexpected high database search and transaction activity. To meet this high demand that may have a short lead time—the high demand in a ski area may be created within 24 hours of snowfall—the database reservation system can be configured with the predictive model to automatically identify in the database records that are most likely to be transacted in the relevant geographic area, and notify operators associated with such records of the option to enable a record activation setting of the reservation system for one or more of the operator's records, wherein the record activation setting enables the reservation system to, upon the operator's selection of said setting, automatically enable the operator's record appears in search results for a user to directly conduct an immediate transaction without requesting and waiting for the operator's manual approval of the transaction.

BRIEF DESCRIPTION OF THE DRAWINGS

The invention has other advantages and features which will be more readily apparent from the following detailed description of the invention and the appended claims, when taken in conjunction with the accompanying drawings, in which:

DETAILED DESCRIPTION

System Overview

Figure 1:
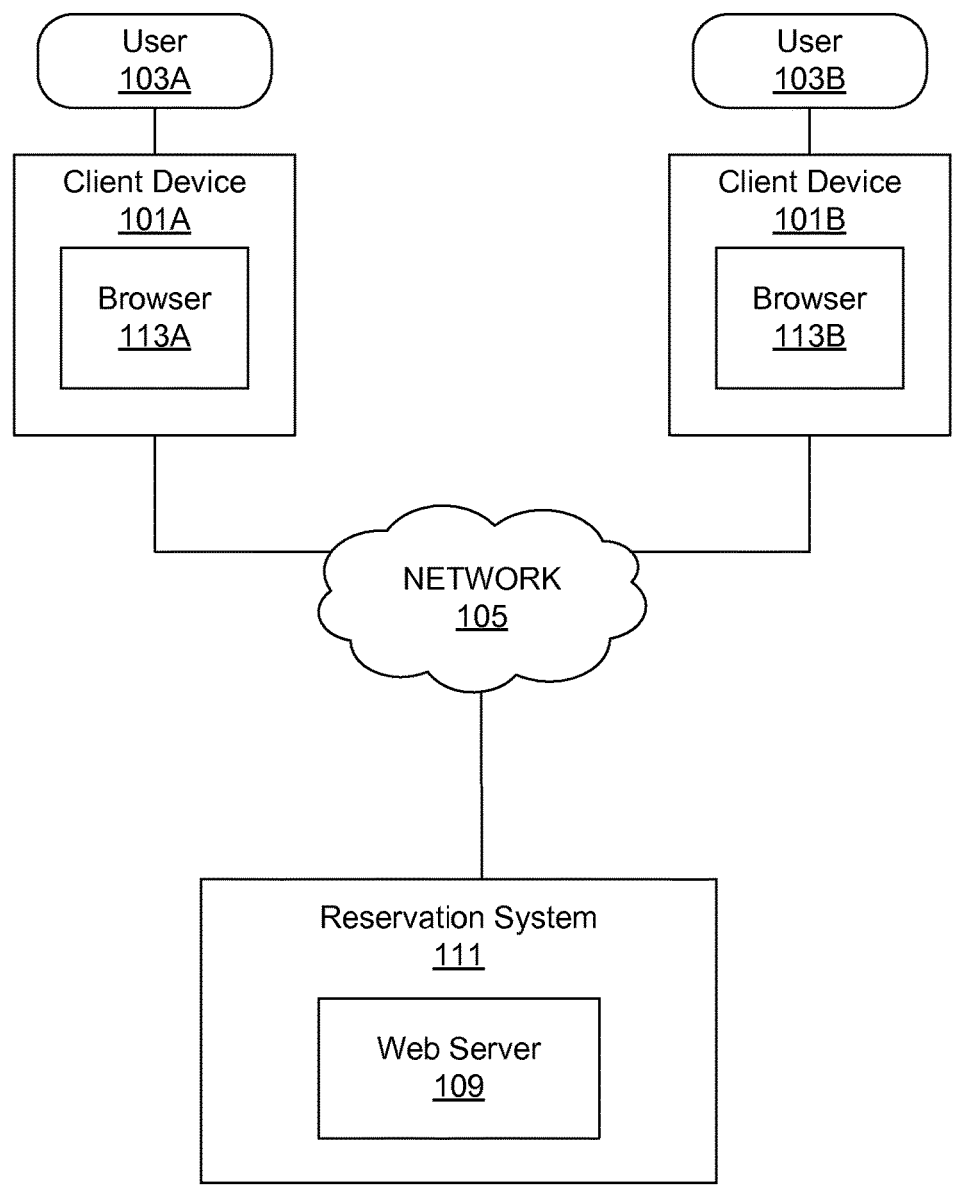
FIG. 1 is a block diagram of a computing environment including a reservation system, according to one embodiment.

FIG. 1 is a block diagram of a computing environment including a reservation system that estimates demand in terms of database search requests and transactions in a geographical area and identifies operators that have record that can meet the demand, according to one embodiment. FIG. 1 and the other figures use like reference numerals to identify like elements. A letter after a reference numeral, such as "113A," indicates that the text refers specifically to the element having that particular reference numeral. A reference numeral in the text without a following letter, such as "113," refers to any or all of the elements in the figures bearing that reference numeral (e.g. "113" in the text refers to reference numerals "113A" and/or "113B" in the figures).

The network 105 represents the communication pathways between users 103 (e.g., consumers) and the reservation system 111. In one embodiment, the network is the Internet. The network can also utilize dedicated or private communication links (e.g. WAN, MAN, or LAN) that are not necessarily part of the Internet. The network uses standard communications technologies and/or protocols.

The client devices 101 are used by the users 103 for interacting with the reservation system 111. A client device 101 is a computer having one or more processors, memory, storage, and networking components (either wired or wireless). The device executes an operating system, for example, a Microsoft Windows-compatible operating system (OS), Apple OS X or iOS, a Linux distribution, or Google's Android OS. In some embodiments, the client device 101 may use a web browser 113, such as Microsoft Internet Explorer, Mozilla Firefox, Google Chrome, Apple Safari and/or Opera, as an interface to interact with the reservation system 111. In other embodiment, the client device 101 can execute a dedicated application for accessing the reservation system 111.

The reservation system 111 includes web server 109 that presents web pages or other web content, which form the basic interface to the users 103. Users 103 use respective client devices 101 to access one or more web pages, and provide data to the reservation system 111.

In one embodiment, the reservation system 111 provides users with computer mediated access to a database storing records of resources (e.g. goods and services) that are available to users, and for which the real world, physical location of the resource is considered as an intangible factor in the user's decision to consume (e.g., purchase, license, or otherwise obtain) the resource. Generally, resources available at some locations are more desirable than otherwise identical resources available at other locations. Resources include accommodations; restaurants; vehicles; attractions (e.g., shows, events, tourists attractions); and the like. For example, in a reservation system 111 that provides accommodations, accommodations in particular neighborhoods may be more or less desirable than otherwise identical accommodations in some neighborhood: a given neighborhood may be considered more interesting, more prestigious, safer, or have some other quality that consumers deem valuable when selecting accommodations.

In some embodiments, the reservation system 111 facilitates transactions between users 103. For example, a reservation system enables users 103 to book accommodations provided by other users of the reservation system. A rideshare reservation system allows users 103 to book rides from one location to another. A marketplace system allows users 103 to buy and/or sell goods or services face to face with other users. The reservation system 111 comprises additional components and modules that are described below.

Reservation System Overview

The following description provides an example implementation in the form of a reservation system 111 in which the resources are accommodations. A booking is a type of transaction in which a user obtains access to an accommodation described in a database record managed by an operator. A reservation request is an instance of a database activity in which a user searches the database for record of a suitable accommodation and sends the operator a request to book the accommodation.

Figure 2:
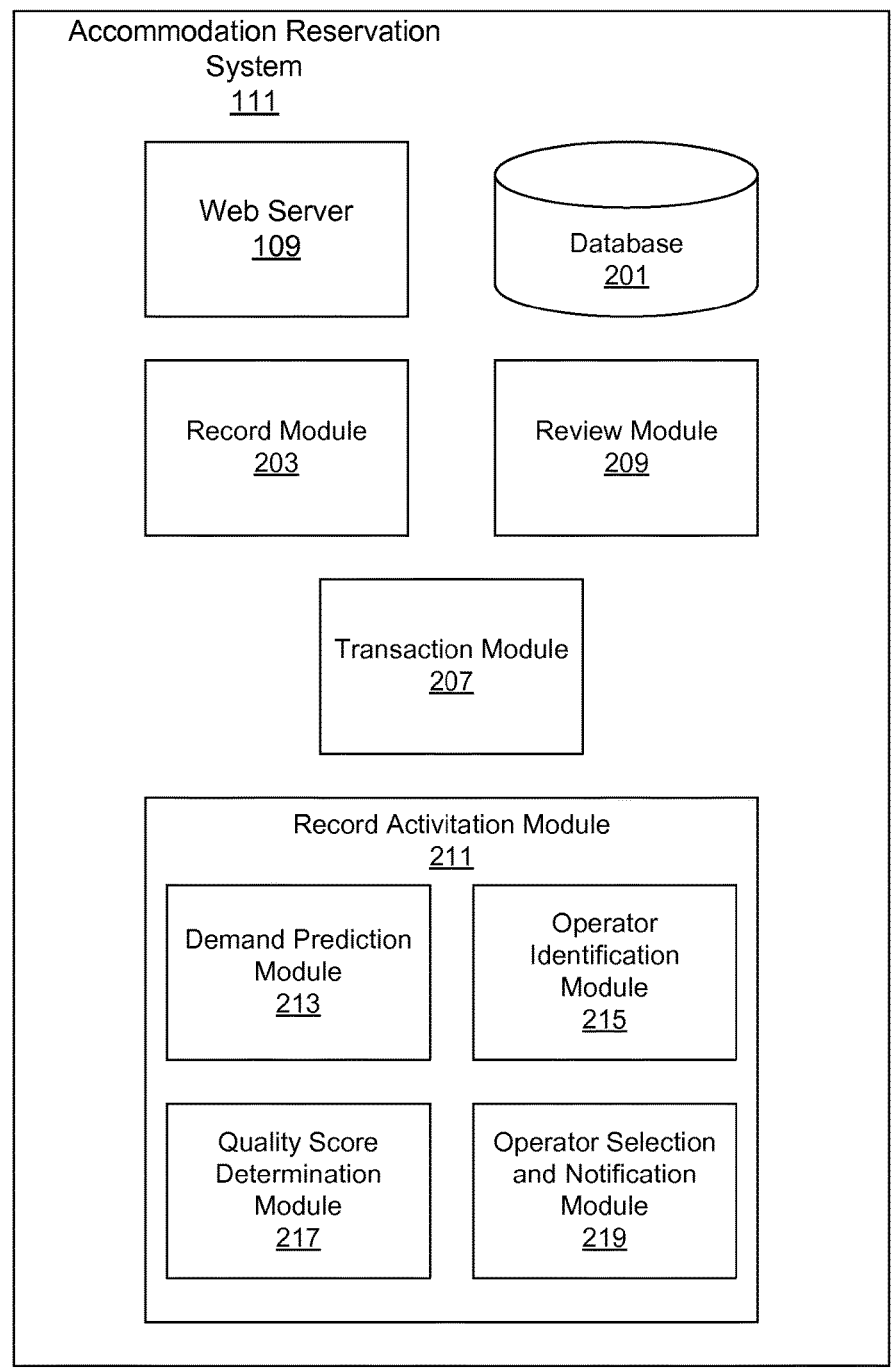
FIG. 2 is a block diagram of logical components of a reservation system that estimates demand in terms of database search requests in a geographical area and identifies operators that can meet the demand, according to one embodiment.

FIG. 2 is a block diagram of the software architecture of a reservation system 111 that is configured to estimate demand for reservation requests in a geographical area and identifies operators that can meet the demand, according to one embodiment. The reservation system 111 includes a database 201, a record module 203, a transaction module 207, a review module 209, and a record activation module 211. The record activation module 211 further includes a demand prediction module 213, an operator identification module 215, a quality score determination module 217 and an operator selection and notification module 219. None of the foregoing modules or the particular operations are native or necessary components of a generic computer system. Each of these modules is implemented by respective program code that performs the algorithms and functions described below; in no case are the algorithms or functions described herein performed by humans by mental steps, nor could such operations be performed by mental steps in any useful or practical embodiment recognized by those of skill in the art.

Those of skill in the art will appreciate that the reservation system 111 will contain other modules appropriate for its functionality (e.g., social networking, banking, commerce, etc.), but that are not described herein, since they are not directly material to the invention. In addition, conventional elements, such as firewalls, authentication and encryption systems, network management tools, load balancers, and so forth are not shown as they are not material to the invention. The reservation system 111 is implemented on a network of computers, including cloud-based computer implementations. The computers are server class computers including one or more high-performance computer processors and main memory, and running an operating system such as LINUX or variants thereof. The operations of the system 111 as described herein can be controlled through either hardware or through computer programs installed in non-transitory computer storage and executed by the processors to perform the functions described herein.

The database 201 is implemented using non-transitory computer readable storage devices, and suitable database management systems for data access and retrieval. The database 201 is implemented in a database management system, such as a relational database (e.g., MySQL). The database 201 may also be implemented via a web service such as RDS (Relational Database Service) provided by Amazon. The reservation system 111 includes other hardware elements necessary for the operations described here, including network interfaces and protocols, input devices for data entry, and output devices for display, printing, or other presentations of data. As will become apparent below, the operations and functions of the reservation system 111 are sufficiently complex as to require their implementation on a computer system, and cannot be performed as a practical matter in the human mind.

The record module 203 is configured to provide a user interface and processing logic for users ("operators") to create records of goods or services for purchase or license to other users, and is one means for performing this function. For example, in the reservation system 111, the record module 203 provides a user interface suitable for creating records of accommodations, such as houses, apartments, condominiums, rooms, treehouses, castles, tents, couches, and sleeping spaces. If the reservation system 111 is a dining reservation system, then the record module 203 provides a user interface for creating records of available reservations at restaurants, entertainment venues, resorts, etc. If the reservation system is a rideshare reservation system, then the record module 203 provides a user interface for creating records of available rides.

The record module 203 is configured to receive a record from a user. A record is a structured data input, comprising a plurality of data fields that describes the good or service being offered, a time frame of its availability, a price, a location, a description of the good or service being offered and a contact for the operator offering the good or service. For example, for a reservation system, a record includes the attributes of a record identifier, a title, a summary description a type of property to be reserved (e.g. house, apartment, room, cabin, bed & breakfast, etc.), type of room (e.g., entire unit, private room, shared room), number of bedrooms, number of bathrooms, number of beds, the dates that the good or service is available, and a transaction rate (e.g., transactions per night, week, month, etc.) and currency, a list of amenities (e.g., TV, cable, air conditions, heating, kitchen, internet, washer, pool, elevator, etc.), and features (e.g., smoking, pets allows, wheelchair accessible). The record identifier is a unique identifier that allows the record to be accessed in the database 201. The record module 203 allows the user to include in a record additional information about the good or service including photographs and other media. The location information for a record provides specific reference to a physical location or area in the real world of the accommodation, and may include a country, state, city, and neighborhood of the accommodation, geographical coordinates, mailing addresses, or other suitable location specifying information. The record module 203 is also capable of converting one type of location information (e.g., mailing address) into another type of location information (e.g., country, state, city, and neighborhood) using externally available geographical map information. Records created using the record user interface are processed by the reservation system 111 and stored in the database 201 in record records.

In some reservation systems 111, some records are for temporary accommodations that are available for usage one time only, and/or are capable of being deleted by the operator managing the record. The record module 203 stores these historical, unavailable records in database 201. The reservation system 111 uses these historical records to analyze the behaviors of users in creating, searching, ranking, and booking records. Historical records may be encrypted or otherwise protected so that they are not available to anyone other than the operator of the record system.

The transaction module 207 is configured to provide a user interface and processing logic for users to search for and access records of potential accommodations of interest, and to book an accommodation described in a record created by an operator, and is one means for performing this function. The transaction module 207 receives payment information from a user of the accommodation, and securely transmits the payment to the operator. Any user information transmitted as part of the purchase processed is encrypted for user privacy and protection. Upon completion of a transaction by which the operator grants access to the accommodation and the user pays for such access, the transaction information is encrypted and stored as historical transaction information in database 201.

The review module 209 is configured to provide a user interface and processing logic to receive reviews of the accommodations described in the records offered by the operators, providing evaluations, feedback, and other commentary about an accommodation, and is one means for performing this function. Completed reviews be included within and appear alongside records, so that future users can evaluate the accommodation with the reviews in mind. Reviews are stored in conjunction with their associated records in the database 201. Similarly to historical records, reviews for historical records may continue to be stored in database 201 after the record is no longer available.

The record activation module 211 is configured to automatically 1) estimate demand for accommodations in one or more geographical areas in terms of database searches and transactions, 2) identify and 3) notify operators in each geographic area having accommodations that can meet the demand of an option to activate their respective records to appear in database search results and be configured for an immediate transaction, and is one means for performing these functions. The demand prediction module 213 is implemented by code that estimates a measure D of the unmet demand for accommodation reservations in a geographical area for a specific time interval. The operator identification module 215 is implemented by code that identifies a list of operators that can fulfill the unmet demand for the accommodation reservations. The quality score determination module 217 is implemented by code that determines a quality score for all the identified operators that can enable a record activation setting for their records, by which the records are configured to appear in database search results for accommodations that can be immediately booked by the users. Finally, the operator selection and notification module 219 is implemented by code that notifies the identified operators of the option to enable a record activation setting of the reservation system 100 for their respective records. None of the foregoing modules are native or necessary components of generic computer system.

The demand prediction module 213 queries the database 201 by specifying a geographic area and a time period for certain historical and current database records. The database 201 provides in response to the query a set of historical records and current records that are associated with search requests for the specific geographical area and time period. The retrieved records include records are immediately bookable. An immediately bookable record is a record in a geographical area that is pre-designated as available for a user to obtain use of the described accommodation in an immediate transaction, without requiring further manual operator confirmation or approval. For example, the records may include factors like the number of reservations of records, the number of searches for records, the number of database requests received for each of the records, for a specific geographical area and a specific time.

Figure 4:
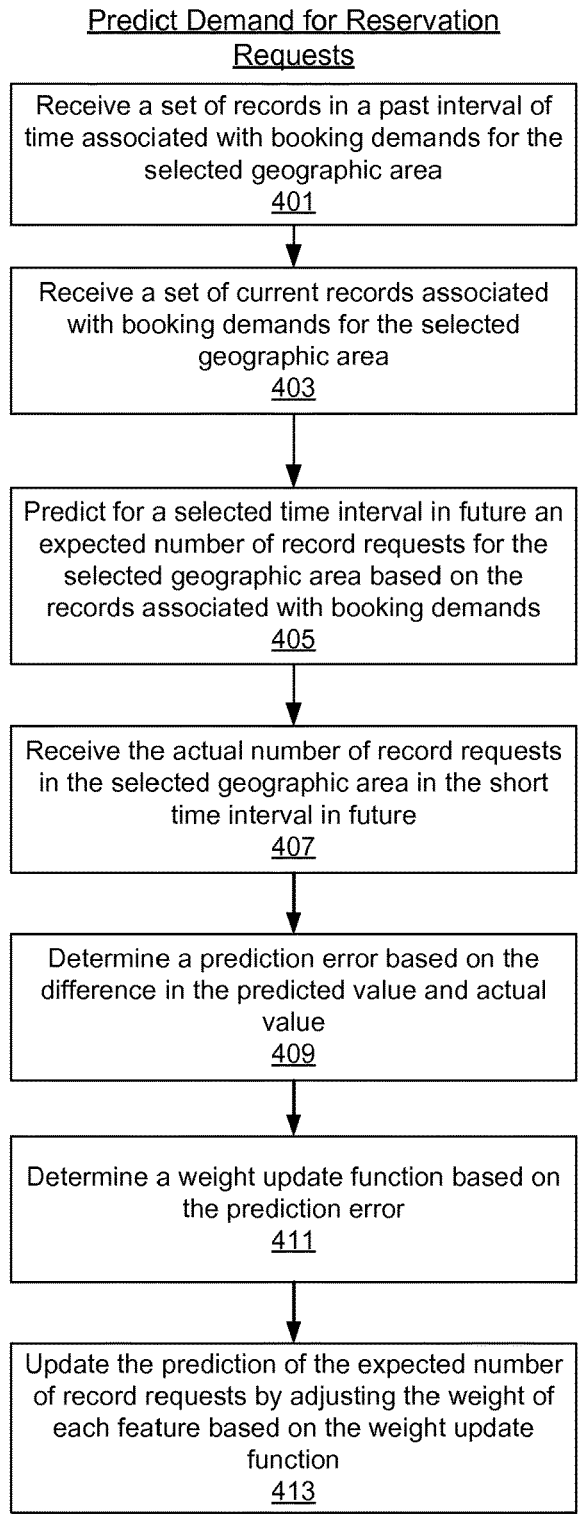
FIG. 4 is a flow chart for estimating demand in terms of database search requests, according to one embodiment.

The time period for historical records may be any historical period for which records are available in the database 201. For example, the demand prediction module 213 may use database search and transaction activity in the specified geographical area from the last month, last three months, last 6 months, last year, all time, or any period between. The time span for current records is the current time period, specifically it may be in the range of a few seconds to a minute. The data set for the current and historical records associated with the database search and transaction activity is stored by the record module 203 and the transaction module 207 in the database 201. The demand prediction module 213 computes a measure (equivalently, an estimate) of the unmet demand D for accommodations using a machine learning model such as logistic regression, winnow, random forest or other such similar method. FIG. 4 below describes one implementation of the linear regression model for demand prediction.

The operator identification module 215 identifies a list $H=(h_i, \ldots h_n)$ of operators in a geographical area that are most likely to enable record activation, wherein record activation enables an operator's record to appear in database search results and be immediately bookable for a limited period of time. To generate this list H, the operator identification module 215 queries the database 201 and retrieves from there a set of historical records and current records that are associated with the records managed by each operator in a specific geographical area and a time period. For example, the records may include factors like the number of times the operator has enabled the record activation setting in the past, the response time of an operator to a record activation notification, the update time associated with an availability calendar of the record offered by an operator.

Figure 5:
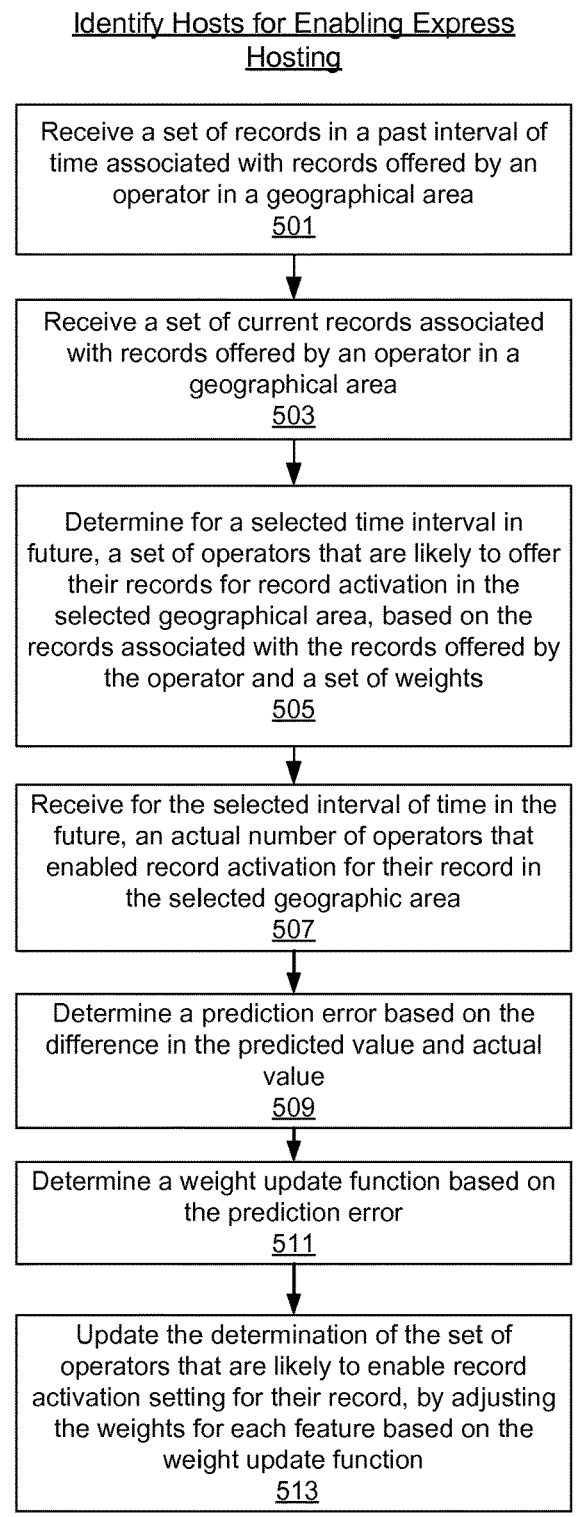
FIG. 5 is a flow chart for identifying operators offering records that are most likely to enable the record activation setting, according to one embodiment.

The time period for historical records may be any historical period for which record data is available in the database 201. For example, the operator identification module 215 may use records and associated operator data in the specified geographical area from the last month, last three months, last 6 months, last year, all time, or any period between. The time for current records is the current time period, specifically it may be in the range of a few seconds to a minute. The data set for the current and historical records associated with records offered by an operator is stored by the record module 203 and the transaction module 207 in the database 201. The operator identification module 215 identifies a list H of operators likely to enable record activation for their records as calculated by a machine learning model, such as logistic regression, winnow, random forest or other such similar method. FIG. 5 below describes one implementation of the logistic regression model for operator identification.

Figure 6:
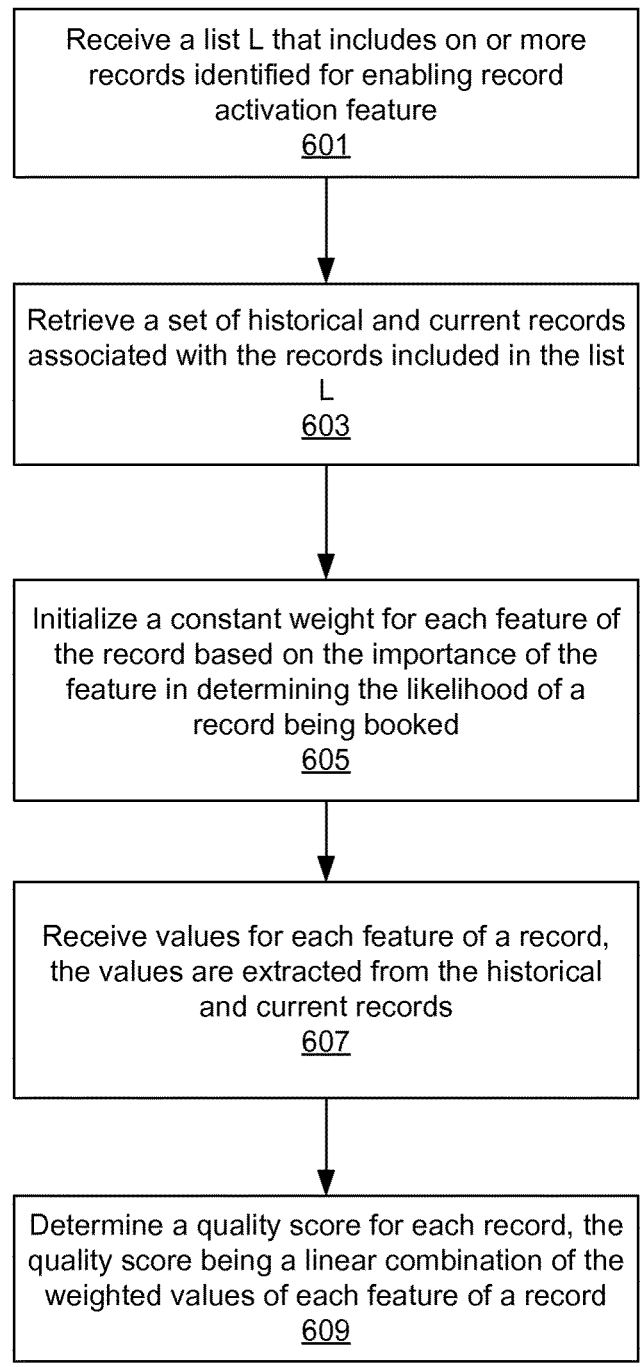
FIG. 6 is a flow chart for determining quality score for a set of records, according to one embodiment.

For each operator $h_i$ identified in operator list H, there are one or more records, $l_{i,j}$, forming list L. The quality score determination module 217 determines a quality score $q_{i,j}$ for each record $l_{i,j}$ in list L. The quality score $q_{i,j}$ is based on the likelihood of the record $l_{i,j}$ being booked if the operator $h_i$ were to enable the record activation setting. The quality score $q_{i,j}$ is computed by combining one or more record features such as average review score of a record, number of transactions for a record, number of pictures associated with the record and the like and one or more behavioral booking data related to the record $l_{i,j}$ such as the historical conversion rate of the record, average length of booking, and the like. FIG. 6 below describes one implementation of the linear combination model for determining quality score for each record $l_{i,j}$. The quality score $q_{i,j}$ is higher for a record that is more likely to be booked on after the record activation setting is enabled.

The operator selection and notification module 219 receives the unmet demand measure D from the demand prediction module 213, receives the list of identified operators H likely to enable record activation on their records from the operator identification module, and receives the quality score $q_{i,j}$ of each record $q_{i,j}$ from the quality score determination module 217. The operator selection module 219 ranks the records $l_{i,j}$ in L, and selects the top K records in L in the order of their quality scores q to fulfill the unmet demand for database access (e.g., K=αD, where α is a scaling factor, e.g., 1.1 to 1.5 to allow for some percentage of additional records to be record-activation enabled). The scaling factor accounts for the fact that not all the operators will enable record activation for their records. The operator selection and notification module 219 then notifies the operator $h_i$ associated with each selected record $l_{i,j}$ of the option to enable the record activation setting for the record. The notification to the operator is sent via electronic communication means such as email, SMS, or push notifications.

In situations in which the systems discussed here collect personal information about users, or may make use of personal information, the users may be provided with an opportunity to control whether programs or features collect or store user information (e.g., whether to maintain historical records, historical search queries, and historical transactions), or to control whether and/or how to receive content from the reservation system 111 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as an address, city, or neighborhood), so that a particular location of a user cannot be determined. Thus, the user may have control over how information is collected about the user and used by the reservation system 111.

Dataflow for Selecting Records for Record Activation and Operator Notification

Figure 3:
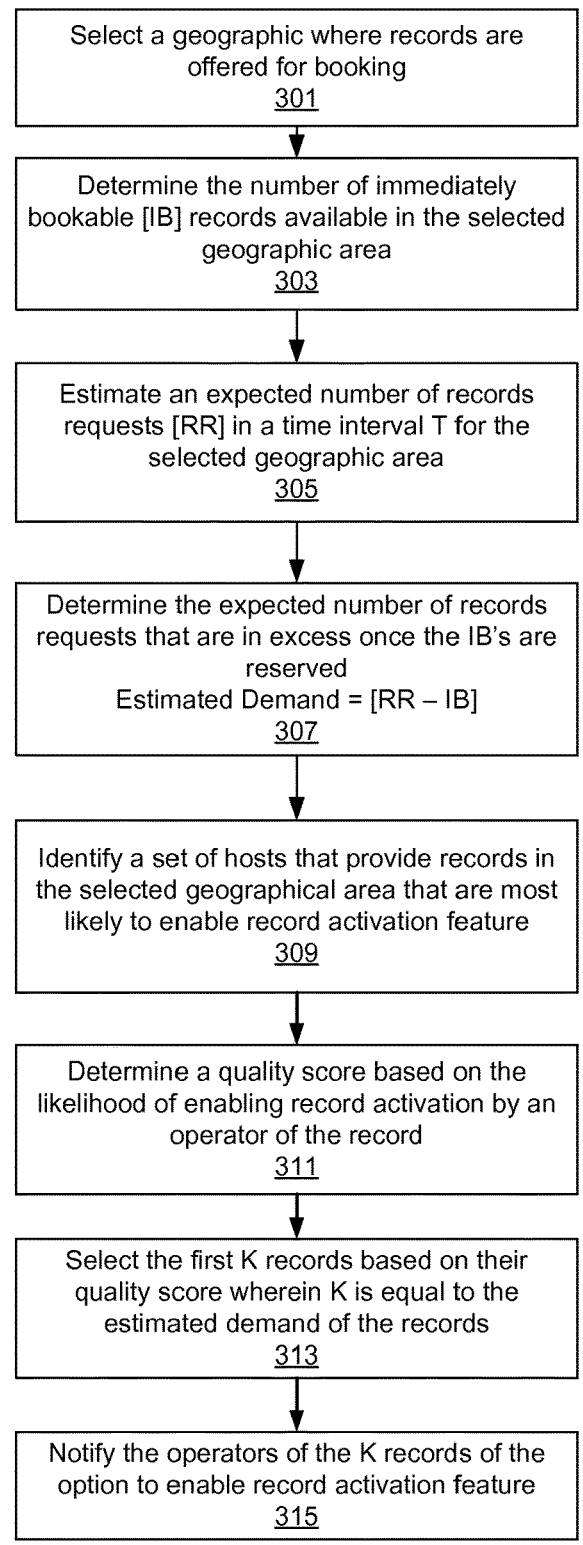
FIG. 3 is a flow chart for selecting and notifying operators of the option to enable record activation, according to one embodiment.

FIG. 3 is a flow chart for selecting and notifying operators of the option to programmatically enable record activation for their records, as provided by one embodiment of the record activation module 211. A geographical area that has records for available for manual transactions is selected 301. The records are stored by the record module 203 in the database 201 and retrieved by the record activation module 211 by conducting a geographical area based search for records. The retrieved records include a set of records that are available for booking by manual transaction or are immediately bookable. Immediately bookable records are pre-designated as available for an immediate transaction without further manual operator approval. The number of immediately bookable records [IB] is determined 303.

An expected number of records requests [RR] in the specific time interval and geographical area are estimated 305 based on the current and historical reservation demand records data. The estimation of record requests [RR] is performed by the demand prediction module 123 using a computer model that applies a machine learning method such as linear regression, winnow, random forest or another similar technique. For sake of example, a linear regression model is further described below with respect to FIG. 4. The unmet demand D for record requests in the specific geographical area and time interval is determined 307 as the excess number of estimated record requests once the records configured to immediate transactions are booked, i.e. D=RR−IB. For example, the estimated record requests on a weekend in February for "reservation" type records in the Lake Tahoe area may be RR=1000. The types of properties to be reserved may include bed and breakfasts, cabins, vacation homes, apartments, a room in a home, etc. The number of records available for an immediate transactions that are available in the database for that February weekend in the Lake Tahoe area may be determined as IB=100. Thus, the estimated unmet demand D for record requests is 1000−100=900.

A set of operators that offer records in the specific geographic area and are most likely to enable the record activation setting for their records are identified 309. The set of operators are identified by the operator identification module 215 using a computer model that applies a machine learning method on the historical and current records in the specific geographical area for a time interval. The records are retrieved from the database 201. The records offered by the set of operators forms a list. For each record in the list, a quality score is determined 311 based on the likelihood of the user booking the record given that the operator has enabled record activation for the record. The quality score is higher for a record of an operator that is more likely to enable the record activation setting. Based on the quality score of the records, the top K (e.g., K=αD) records are selected 313 to meet the unmet request demand. The operators of the top K records are notified 315 of the option to enable the record activation setting of the reservation system 111 for one or more of their records.

Demand Prediction Model

FIG. 4 is a flow chart for estimating demand in terms of record requests in the database, according to one embodiment of the demand prediction module 213. The estimates are done by a computer model that applies a machine learning method such as logistic regression, winnow, random forest or other such similar method to data indicative of record requests. FIG. 4 describes one implementation of a linear regression method for demand prediction. The demand prediction model B, receives a specific geographical area and a specific time interval in which the demand prediction is to be done. The specific time interval is likely to be in the short term future time frame. In the various embodiments, a short time interval or duration comprises any interval from 24 to 72 hours in future. The demand prediction model B further retrieves 401 by querying the database 201 a data set comprising of historical records and 403 current records $R(r_1 \ldots r_n)$ wherein $r_1 \ldots r_n$ represents a feature set of the records associated with request demand in a specific geographical area for a requested time interval. The historical and current records R contain data related to request demand, for example, features such as the number of transactions made $r_1$, the number of people that contacted an operator for their records $r_2$, the searches for records $r_3$, the average pricing for the transactions $r_4$, the number of available records $r_5$, the number of views for a record $r_6$ and other such data. The historical records may be over a requested time interval in history, for example, the last year, the past 2 months or the past 1 week. The current records are the current values of the above mentioned features, for example, the number of records currently available in the geographic area.

The features $r_1 \ldots r_n$ of the historical records and current records R may be initialized with a weight $w_{r1} \ldots w_{rn}$ equal to 1. The weight for each feature of the historical and current records R is maintained by the demand prediction model B. The demand prediction model B receives values $\{x_1 \ldots x_n\}$ for $\{r_1 \ldots r_n\}$ from the retrieved historical and current R records. The model B predicts 405 an estimated number of record requests based on a function that is a linear combination of the weights $(w_{r1} \ldots w_{rn})$ and values $(x_1 \ldots x_n)$ of the features of the historical and current R records and a bias weight term represented by $wr_0$. The function may be represented as $$f(x)=wr0+wr1 \cdot x1+wr2 \cdot x2+ \ldots wrn \cdot xn = wr0 + \Sigma_{j=1}^{n} wrj \cdot xrj$$

To understand the estimation, the following example is provided. Assume that there the above six features (i.e., $r_1 \ldots r_6$) are used ease of calculation. Let the initial weights $(w_{r1}, w_{r2}, \ldots w_{r6})$ for all features r be set to 1. Let the values $(x_1 \ldots x_6)$ for features $(r_1, r_2 \ldots r)$ be (10, 50, 80, 100, 2, 100): this means that there are 10 transactions made ($r_1$), 50 people contacted an operator for their records in the geographic area ($r_2$), 100 searches for records ($r_3$), $100 is the average pricing for the records ($r_4$), 2 records are available in the area ($r_5$), and there are 100 views for records in the geographic area ($r_6$).

Based on the equation above, considering $wr_0$ to be 0, then:

$$f(x)=0+(1*10)+(1*50)+(1*80)+(1*100)+(1*2)+(1*100)=342,$$

the demand prediction module 213 predicts a demand of 342 record requests in the geographic area.

The demand prediction model B receives 407 an actual demand in terms of the record requests in the geographic area and determines 409 a prediction error based on the predicted demand and an actual demand of the record requests. The prediction error is a difference in the predicted value and actual value of the demand for record requests. Based on the prediction error, the prediction model B learns the weights and determines a weight update function 411 as described below.

To learn the weights the demand prediction model B is trained over a set of observations and a least mean squares update rule is applied. This means that an initial vector of weights and a constant learning rate α is chosen. For each training example i and for each weight component $w_{rn}$ the following update function is applied 413.

$$w_{rn}^i = w_{rn} + \alpha(y^i - f(x^i))x_{rn}^i$$

The $x_{rn}^i$ refers to the $i^{th}$ vector component of the training sample $r_n$. Continuing the illustrated example let's learn the weight for a feature $r_1$ that has a value $x_1$, $x_1$=10 transactions made ($r_1$). Assume a constant learning rate α=0.05 (other rates can be used). The value $y_i$ is the actual demand; assume that there are 300 actual record requests. As noted above, the predicted value f(x) is 342. Using the update function, the new value of $w_{r1}$ is $$w_{r1}=1+0.05(300-342)*10=-20.$$

The weight values ($w_{rn}$) for all the features are calculated similarly using the weight update function. The new weight values are then applied to demand prediction model B and the weight update process is repeated until the weight converges for an accurate prediction value.

Model

The operator identification is done by the operator identification module 215 using a computer model that applies a machine learning method such as logistic regression, winnow, random forest or other such similar algorithms. FIG. 5 is a flow chart for identifying operators offering records that are most likely to enable the record activation setting, according to one embodiment of a logistic regression method for operator identification. The operator identification model H receives a specific geographical area and a specific time interval in which the operators and records associated with the operators need to be identified. The specific time interval is likely to be in the short term future time frame, around 24 to 72 hours in future. The operator identification model H further retrieves 501 by querying the database 201 a set of historical records and 503 current records R($r_1 \ldots r_n$) wherein $r_1 \ldots r_n$ represents a feature set of the records associated with records offered by an operator in a specific geographical area for a requested time interval. The historical and current records R contain data associated with the operator and data associated with the record. For example, the data associated with the operator may include the features of the number of times the operator has enabled record activation for their records $r_1$, the response time of an operator for a record activation request for their record $r_2$, the time taken by an operator for updating calendar entries for a record $r_3$ and other such data. The data associated with a record may include the number of pictures of the record $r_4$, the occupancy for the record $r_5$, the transaction availability of the record $r_6$, the user ratings for the record $r_7$ and other such data. The historical records may be over a requested time interval in history, for example, the last year, the past 2 months or the past 1 week. The current records are again for the currently available records in the geographic area.

The features $r_1 \ldots r_n$ of the historical records and current records R are initialized with a weight $w_{r1} \ldots w_{rn}$ equal to 1. The weight for each feature of the historical and current records R is maintained by the operator identification model H. The operator identification model H further receives values $\{y_1 \ldots y_n\}$ for $\{r_1 \ldots r_n\}$ from the retrieved historical and current R records. The model H identifies 505 a set of operators that are likely to enable a record activation setting for their record based on a function that applies logistic regression method (e.g. sigmoid function) based on the weights ($w_{r1} \ldots w_{rn}$) and values ($y_1 \ldots y_n$) of the features of the historical and current R records and a threshold n that represents the classification boundary for prediction. The function may be represented as $$h(x) = g(f(x))$$

where $f(x) = wr0 + \Sigma_{j=1}^{n} wrj \cdot yrj$
and $g(f(x))$ represents the sigmoid function $$\left(\frac{1}{1+e^{-f(x)}}\right).$$

The sigmoid function transforms the value of f(x) into the range between 0 and 1. Further, the classification boundary for prediction is given by:

If h(x)>0.5 then predict 1, else predict 0.

To understand the identification process, the following example is provided. Assume here that just three of the above operator identification features (i.e. $r_1 \ldots r_3$) are used for ease of calculation. Let the initial weights for these features be ($w_{r1}, w_{r2}, w_{r3}$) be (0.5, 0.5, 0.5), and let the values ($y_1, y_2, y_3$) for the features be (2, 1, 1). The example values indicate that this particular operator enabled record activation for this record two times in the past ($y_1$), the average response time ($y_2$) of the operator for activating record activation is 1 minute in those two instances, and the average time ($y_3$) taken by the operator to update the record calendar is 1 minute. In this example, f(x) is:

$$(0+0.5*2+0.5*1+0.5*1)=2$$

and h(x)=0.88, i.e., the predicted value is 0.88.

Based on the classification boundary, the operator identification module H will predict a value of X=1, indicating that this operator is highly likely of enabling the record activation feature.

The operator identification model H receives 507 an actual list of operators that enabled record activation feature for their record in the geographic area and determines a prediction error 509 based on the difference of a predicted value of an operator for enabling record activation setting and the actual value of the operator for enabling record activation. Based on the prediction error, the prediction model H learns the weights and determines a weight update function 511 as described below.

To generate the weights $w_{rj}$ the operator identification model is trained over a set of observations using stochastic gradient ascent over the log likelihood. This means that an initial vector of weights and a constant learning rate α is specified and for each training example i and for each weight component $w_{rj}$ the following update function 513 is applied.

$$w_{rj} := w_{rj} + \alpha(y^i - h(x^i))x_{rj}^i$$

The $x_{rj}^i$ refers to the $i^{th}$ vector component of the training sample $r_j$. Continuing the illustrated example let's learn the weight for a feature $r_1$ that has a value $x_1$, $x_1$ indicates that the operator enabled record activation setting two times for their record ($r_1$). Again, assume the constant learning rate α=0.05. The value $y_i$ is the actual record activation setting of the host; assume it is 0, indicating that the operator did not enable the record activation setting for their record. As noted above, the predicted value h(x) is 0.88. Using the update function, the new value of $w_{r1}$ is:

$$0.5+0.05(0-0.88)*2=0.412.$$

The weight values ($w_{rn}$) for all the features are calculated similarly using the weight update function. The new weight values are then applied to the operator identification model H and the weight update process is repeated until the weight converges for an accurate prediction value.

Quality Score Determination Model

FIG. 6 is a flow chart for determining quality score for a set of records, according to one embodiment of the quality score determination module 217. The estimates are done by a computer model that applies an analytical method such as weighted linear combination or other such similar method. FIG. 6 describes one implementation of a weighted linear combination method for demand prediction. The quality score determination model Q, receives 601 a list L that includes one or more records identified for enabling record activation feature by querying the database 201. The quality score determination model Q further retrieves 603 by querying the database 201 a data set comprising of historical records and current records R($r_1 \ldots r_n$) wherein $r_1 \ldots r_n$ represents a feature set of the records associated with the records $l_i$ included in the list L. The historical and current records R contain data related to record attributes and record behavior, for example, features such as the average review score of the record $r_1$, number of transactions for a record $r_2$, number of pictures for a record $r_3$, historical conversion rate for a record (i.e. the ratio of the number of users that contacted the operator of the record for transaction to the number of users that viewed the record) $r_4$ and other such data. The historical records may be over a requested time interval in history, for example, the last year, the past 2 months or the past 1 week. The current records are the current values of the above mentioned features.

The features $r_1 \ldots r_n$ of the historical records and current records R may be initialized 605 with a weight $w_{r1} \ldots w_{rn}$ based on the importance of the feature in determining the likelihood of a record being booked. The weight of each feature is a constant maintained by the quality score determination model Q. The quality score determination model Q receives 607 feature values (e.g., average values, aggregated values such as sum, median, etc.,) $\{x_1 \ldots x_n\}$ for $\{r_1 \ldots r_n\}$ from the retrieved historical and current R records. The model Q determines 609 a quality score for each record $l_i$ based on a function that is a weighted linear combination of the weights ($w_{r1} \ldots w_m$) and values ($x_1 \ldots x_n$) of the features of the historical and current R records. The function may be represented as $$f(x)=wr1 \cdot x1+wr2 \cdot x2+ \ldots wrn \cdot xn$$

To understand the calculation, the following example is provided. The example shows three features (i.e. $r_1 \ldots r_3$) for ease of calculation. Let the initial weights ($w_{r1}, w_{r2}, w_{r3}$) be (0.5, 1, 1.5) for features ($r_1, r_2, \ldots r_3$) of a record $l_i$. Let the values ($x_1, x_2, x_3$) be (5, 10, 15), for a record $l_i$, the values indicate a that the record includes 5 pictures ($r_1$), 10 people contacted the record $l_i$ operator in the last week ($r_2$), and there were 15 searches for the record $l_i$ in the past hour ($r_3$). The calculated score for the record $l_i$ would be f(x)=(0.5*5)+ (1*10)+(1.5*15)=35. A quality score is calculated for each record. The higher the quality score, the higher is the likelihood of the record being booked.

Graphical User Interface of Record Activation Notification

Figure 7:
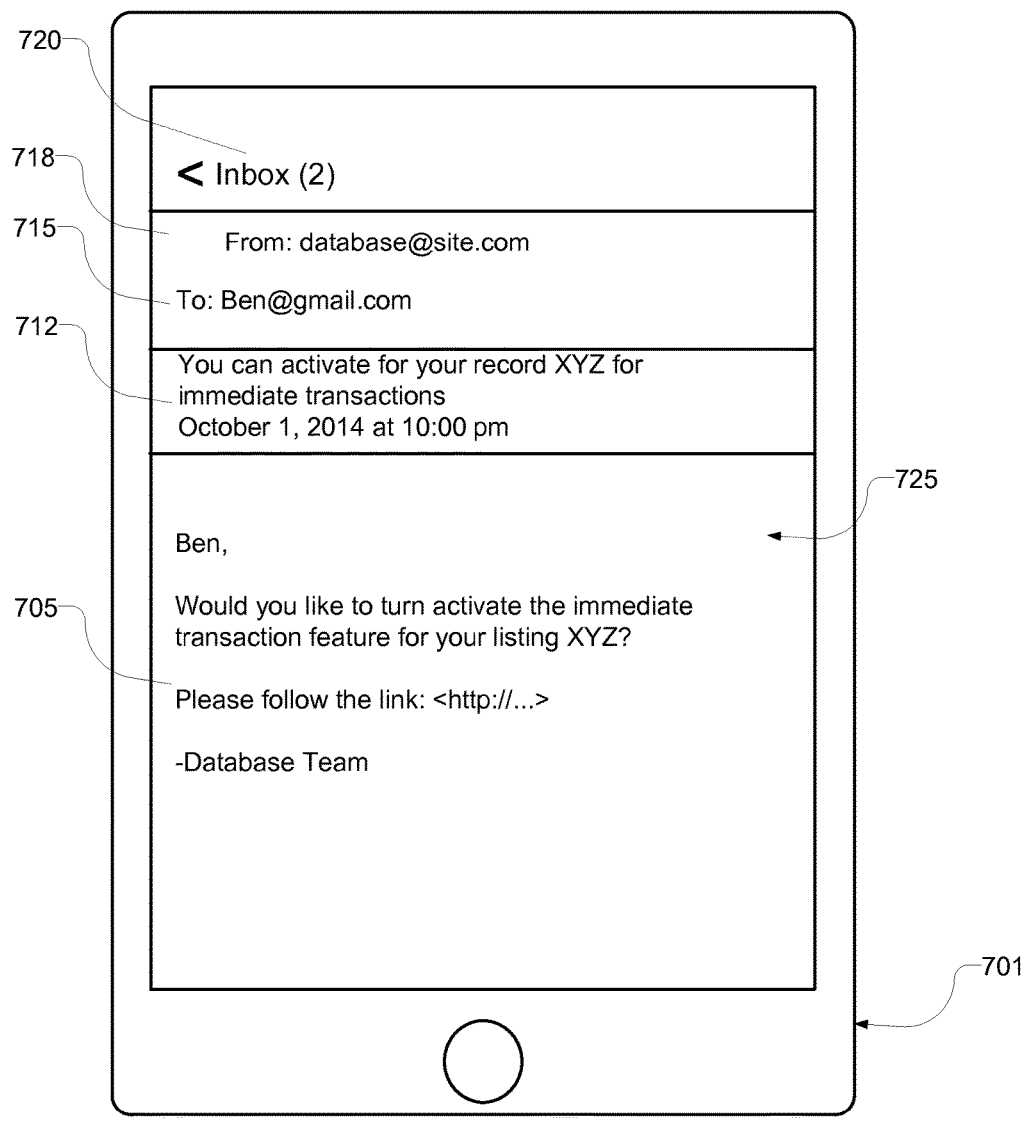
FIG. 7 is an exemplary user interface in schematic form of a notification of option to enable record activation for a record.
Figure 8:
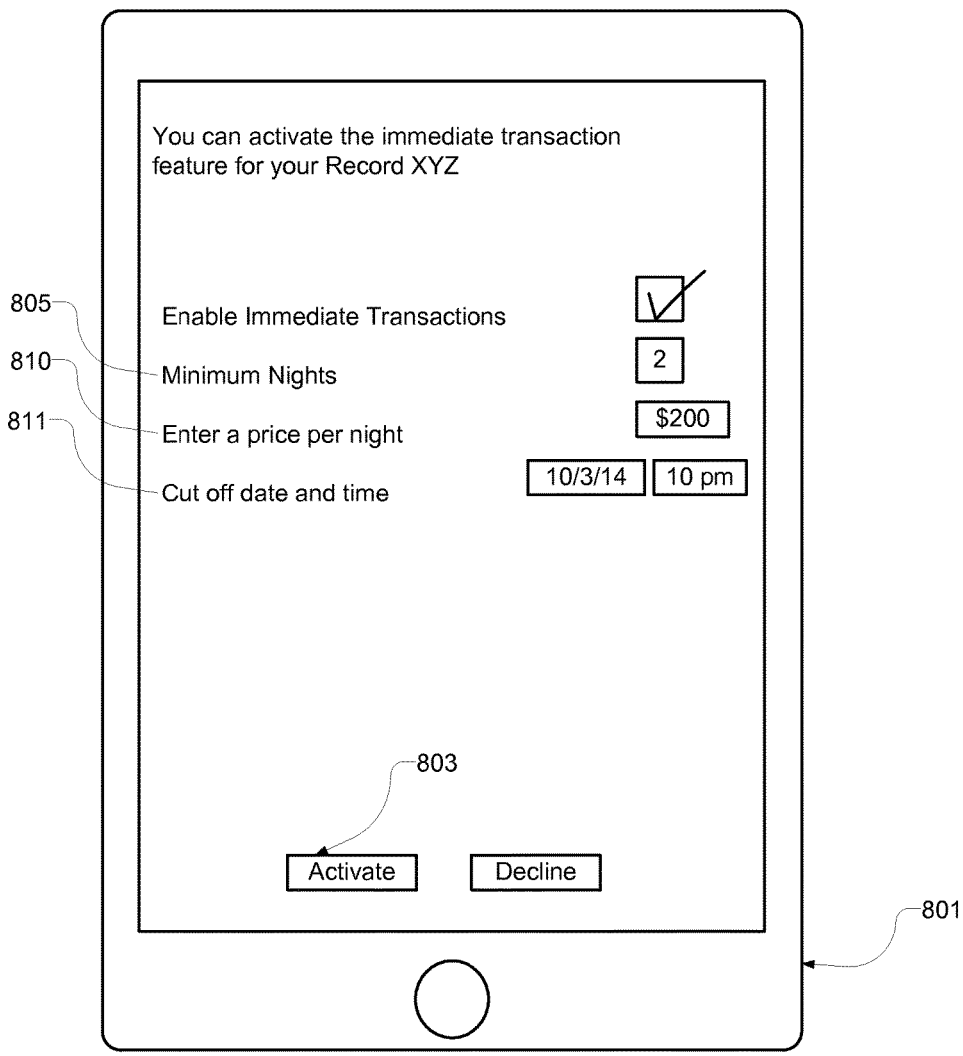
FIG. 8 is an exemplary user interface in schematic form of an application of option to enable record activation for a record according to an embodiment.

FIG. 7 is an exemplary user interface in schematic form of a notification of the option to enable record activation for a record sent by the operator selection and notification module 219, according to an embodiment. FIG. 8 is an exemplary user interface in schematic form of an application to enable record activation for a record according to an embodiment. The example in FIG. 7 indicates a notification sent via email 720 that is viewed on an exemplary mobile device 701. The notification can be sent via several other communication channels such as messaging, push notification and the like. The email includes the sender email address 718, recipient (i.e., the identified host) email address 715 and a subject line 712 that notifies the operator of the option to enable record activation for its record. The email content 725 (or other message type) includes a URL 705 that links to an application (example a web page, or an application dashboard of the operator on the reservation system 111) that allows the operator to enable record activation and view more information related to accommodation of the record. The application includes details related to the accommodation, for example as shown in FIG. 8. The application indicates a cut-off date and time 811 indicating the time available for the operator to enable record activation for the mentioned record and to select minimum nights 810 that the record can be express hosted for. A tip for the price per night 810 is sent by the operator selection and notification module 219.

The application includes a control element, such as enable button 803. When the operator selects the enable button 803, the record activation module automatically enables an express setting for the identified record by setting in the database 211 a record activation flag that has a time stamp associated with it. The timestamp includes a start timestamp and an end timestamp that allows the record to remain immediately bookable for the time indicated by the start and end timestamp. The notification may alternatively include a control element that provides an option to directly enable the record activation setting for the record in the database 201, without requiring the operator to access the reservation system 111, for example by transmitting to the reservation system a message identifying the record by record identifier and including the record activation flag.

Embodiments of the invention may also relate to an apparatus for performing the operations herein. This apparatus may be specially constructed for the required purposes, and/or it may be selectively enabled or reconfigured by a computer program stored in the computer. Such a computer program may be stored in a persistent computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, an example of which is set forth in the following claims.

We claim:

1. A method comprising:

maintaining, in a computerized reservation system, a database storing records of accommodations available for transaction by users, each record comprising a geographic area, an operator offering the record, the stored records comprising a first set of records offered for immediate transaction and a second set of records offered for manual transaction, wherein an immediate transaction occurs without manual approval of the transaction from the operator offering the record, and a manual transaction requires manual approval of the transaction from the operator offering the record;

determining, based on a database query, a number of records in a selected geographic area offered for immediate transaction;

estimating an expected number of database requests to be made by users of the computerized reservation system for records in the selected geographic area for a future time period;

determining a number of excess database requests indicating the number of records by which the expected number of database requests for the future time period exceeds the number of records in the selected geographic area offered for immediate transaction;

identifying, in the second set of records offered for manual transaction, a portion of records in the selected geographic area;

for each record of the identified portion of records offered for manual transaction, determining a quality score for the record based on a likelihood of the record being booked if the record were offered for immediate transaction;

selecting, from the identified portion of records offered for manual transaction, a set of selected records based on the determined quality score for each identified record, a number of selected records at least equal to the number of excess database requests;

sending, to each operator associated with a selected record, a notification of an option to change their record from manual transaction to immediate transaction for the future time period, wherein each notification includes a control element for the operator to programmatically enable the associated record for immediate transaction; and responsive to an operator selection of the control element in a notification, programmatically enabling the associated record for immediate transaction.

2. The method of claim 1, wherein the estimating an expected number of database requests to be made by users of the computerized reservation system for records in the selected geographic area for a future time period further comprises:
retrieving, from the database, a set of historical records from a past time interval associated with transaction demand for the selected geographic area, wherein each historical record comprises a number of transactions for the records in the selected geographic area, a number of searches for records in the selected geographic area, and total contacts received by operators for transaction records in the selected geographic area during the requested time period;
retrieving, from the database, a set of current records associated with transaction demand for the selected geographic area, wherein each current record comprises a number of transactions for the records in the selected geographic area, a number of searches for records in the selected geographic area, and total contacts received by operators for transaction records in the selected geographic area during the requested time period;
predicting, for the future time period, an expected number of database requests for records in the selected geographic area, based on the current and past records associated with transaction demand, each feature of the set of records associated with a weight;
receiving, for the future time period, an actual number of database requests by users for records in the selected geographic area;
determining an error value based on the difference between the actual number of database requests and the predicted number of database requests;
determining a weight update function based on the error value to minimize the error in the predicted number of database requests; and
updating the prediction of the expected number of database requests by adjusting the weight of each feature based on the weight update function.

3. The method of claim 1, wherein identifying, in the second set of records offered for manual transaction, a portion of records in the selected geographic area further comprises:
retrieving, from the database, a set of historical records from a past time interval associated with records offered by an operator in the selected geographic area, wherein a historical record associated with records offered by an operator includes a number of times the operator has enabled record activation, a response time of an operator to a record activation request, and an update time associated with the transaction calendar of the record offered by the host;
retrieving, from the database, a set of current records associated with records offered by an operator in the selected geographic area, wherein a current record associated with records includes an occupancy for the record, a number of days the record is available for transaction, and user ratings for the record;
determining, for the future time period, a set of operators that are likely to offer their record for immediate transaction in the selected geographic area, based on the records associated with the records offered by the operator and a set of weights;
receiving, for the future time period, an actual set of operators that enabled record activation for their record in the selected geographic area;
determining, for each operator of the set of operators that are likely to offer their record for record activation, an error value based on the difference of a predicted value of an operator to enable record activation and the actual value of the operator for enabling record activation;
determining a weight update function based on the error value to minimize the error in the determined set of operators that are likely to offer their record for record activation; and
updating the determination of the set of operators that are likely to offer their record for record activation by adjusting the weights of each feature based on the weight update function.

4. The method of claim 1, wherein determining a quality score for the record further comprises:
retrieving, from the database, a set of historical records from a past time interval associated with records offered by an operator in the selected geographic area, wherein a historical record associated with records offered by an operator includes a feature of a review score for the record, a number of transactions for the record, a number of pictures for the record, and a historical conversion rate for the record;
retrieving, from the database, a set of current records associated with records offered by an operator for the selected geographic area, wherein a current record associated with records offered by an operator includes the features of a current review score for the record, a current number of transactions for the record and a current number of pictures for the record;
receiving a set of weight values for each feature of the records associated with the record offered by an operator for the selected geographic area; and
determining, for each record, a quality score that is a weighted linear combination of the values of each feature obtained from the set of historical and current records.

5. The method of claim 1 wherein identifying, in the second set of records offered for manual transaction, a portion of records in the selected geographic area further comprises:
receiving the number of excess database requests in the selected geographic area and the future time period from a demand prediction model;
receiving a set of operators likely to offer their record for immediate transaction in the selected geographic area and the future time period from an operator identification model;
determining one or more records offered by each of the received set of operators in the selected geographic area; and
forming a list comprising of the determined records offered by the identified operators.

6. The method of claim 5 wherein selecting the number of records further includes identifying a first $K=\alpha D$ records from the list based on the quality score, wherein $D$ is the expect number of database requests, and $\alpha$ is a scaling factor to allow a percentage of additional records greater than the expected number of database requests $D$.

7. The method of claim 1 wherein sending the notifications comprises sending a notification via at least one of email, messaging, Short Message Service (SMS), push notification and dashboard entry.

8. The method of claim 7 wherein the notification includes a Uniform Resource Locator (URL) link to an application that further includes a price tip for a selected record.

9. The method of claim 7 wherein the notification includes a Uniform Resource Locator (URL) link to an application that further includes a cut-off date for a record activation.

10. The method of claim 7 wherein the notification includes a Uniform Resource Locator (URL) link to an application that further includes a minimum night tip that indicates the start and end time for the record available for immediate transaction.

11. The method of claim 1 wherein the future time period comprises a range from 24 to 72 hours in the future.

* * * * *

UNITED STATES PATENT AND TRADEMARK OFFICE
CERTIFICATE OF CORRECTION

PATENT NO. : 10,204,144 B2
APPLICATION NO. : 14/815655
DATED : February 12, 2019
INVENTOR(S) : Spencer de Mars, Kim Pham and Maxim Charkov It is certified that error appears in the above-identified patent and that said Letters Patent is hereby corrected as shown below:

In the Claims

In Column 16, Claim 6, Line 58, please replace "expect" with -- expected --.

Signed and Sealed this
Thirtieth Day of July, 2019

Andrei Iancu
*Director of the United States Patent and Trademark Office*